US007796975B2

(12) United States Patent
Goss

(10) Patent No.: US 7,796,975 B2
(45) Date of Patent: Sep. 14, 2010

(54) METHOD OF TRANSFERRING DATA FILES TO AND FROM A PORTABLE WIRELESS COMMUNICATION DEVICE

(75) Inventor: Dennis E. Goss, Gladstone, VA (US)

(73) Assignee: Sony Ericsson Mobile Communications AB, Lund (SE)

( * ) Notice: Subject to any disclaimer, the term of this patent is extended or adjusted under 35 U.S.C. 154(b) by 0 days.

(21) Appl. No.: 10/904,678

(22) Filed: Nov. 23, 2004

(65) Prior Publication Data
US 2006/0111083 A1    May 25, 2006

(51) Int. Cl.
*H04L 12/58* (2006.01)
(52) U.S. Cl. .................. 455/412.1; 455/556; 455/412.2
(58) Field of Classification Search .............. 455/412.1, 455/414.1, 414.2
See application file for complete search history.

(56) References Cited

U.S. PATENT DOCUMENTS

| 7,050,790 | B2* | 5/2006 | Yamaga | 455/412.1 |
| 7,086,051 | B2* | 8/2006 | Gautney | 717/176 |
| 7,149,509 | B2* | 12/2006 | Shanahan | 455/418 |
| 2001/0045985 | A1 | 11/2001 | Edwards et al. | |
| 2001/0049274 | A1* | 12/2001 | Degraeve | 455/412 |
| 2002/0087624 | A1* | 7/2002 | Liebenow | 709/203 |
| 2003/0134589 | A1* | 7/2003 | Oba | 455/3.03 |
| 2003/0152203 | A1* | 8/2003 | Berger et al. | 379/93.24 |
| 2003/0157960 | A1* | 8/2003 | Kennedy | 455/556 |
| 2005/0100004 | A1* | 5/2005 | Han et al. | 370/352 |
| 2006/0154649 | A1* | 7/2006 | Pedersen et al. | 455/412.1 |

FOREIGN PATENT DOCUMENTS

| EP | 1033894 A2 | 9/2000 |
| EP | 1154631 A2 * | 11/2001 |
| EP | 1154831 A2 | 11/2001 |
| EP | 1289289 A1 | 3/2003 |
| WO | WO9949643 * | 9/1999 |
| WO | WO9955067 * | 10/1999 |
| WO | WO9966746 * | 12/1999 |
| WO | WO 01/72064 A1 | 9/2001 |
| WO | WO0172064 * | 9/2001 |

OTHER PUBLICATIONS

Sony Ericsson Mobile Communications, AB, "International Search Report", International Application No. PCT/US2005/019797, (Sep. 2005).
Sony Ericsson Mobile Communications, AB, "Written Opinion", International Application No. PCT/US2005/019797, (Sep. 2005).
Sony Ericsson Mobile Communications AB, PCT/US2005/019797, International Preliminary Report on Patentability, Dec. 13, 2006.

* cited by examiner

*Primary Examiner*—Lester Kincaid
*Assistant Examiner*—Charles Shedrick
(74) *Attorney, Agent, or Firm*—R. Brian Drozd; Moore & Van Allen PLLC

(57) ABSTRACT

Disclosed is a method of transferring data files from an internal memory within a portable wireless communication device to an external storage device by means of a wireless communication network. A connection is automatically established between the portable wireless communication device and the external storage device via the wireless communication network when a preset trigger condition within the portable wireless communication device occurs. Data files are automatically transferred from the portable wireless communication device to the external storage device using the established connection.

12 Claims, 3 Drawing Sheets

METHOD OF TRANSFERRING DATA FILES TO AND FROM A PORTABLE WIRELESS COMMUNICATION DEVICE

FIELD OF THE INVENTION

This invention relates to a wireless storage system, and more particularly to a method of transferring files between a portable wireless communication device and a wireless storage system.

BACKGROUND

There are a wide variety of portable wireless communication devices. Many portable wireless communication devices have applications that can accommodate a variety of data files. Most portable wireless communication devices, however, have a limited amount internal memory for storing those data files. When the portable wireless communication device's internal storage is at or near its capacity, users typically transfer or delete data file(s) from the portable wireless communication device. Typically only one data file may be transferred from the portable wireless communication device at a time. Usually, a file transfer must occur when the portable wireless communication device is physically connected or in close proximity to an external storage means.

What is needed is a system and/or method that allows a portable wireless communication device user to transfer multiple data files via a wireless communication network to an external storage device.

SUMMARY

One embodiment of the present invention discloses a method of transferring data files from an internal memory within a portable wireless communication device to an external storage device by means of a wireless communication network. A connection is automatically established between the portable wireless communication device and the external storage device via the wireless communication network when a preset trigger condition within the portable wireless communication device occurs. The data files are automatically transferred from the portable wireless communication device to the external storage device using the established connection. An optional status confirmation message from the wireless communication network indicating whether the transfer of files was successfully completed can be requested. One of the preset trigger conditions can be a user settable time parameter. Another of the preset trigger conditions can be a user settable internal memory capacity parameter.

Other embodiments of the present invention permit a manual initiation of a data file transfer as well as a download process to retrieve data files from the external storage device to the portable wireless communication device.

DRAWINGS

For a more complete understanding of the present invention, reference should be had to the embodiments shown in the accompanying drawings and described below.

DESCRIPTION

Certain terminology is used herein for convenience only is not a limitation on the present invention. Portable wireless communication device includes cellular phones; RF equipped personal digital assistants, etc. The phrase "data file" includes picture, audio, video, and text files. Internal memory includes fixed memory and removable media such as memory sticks or compact flash cards. These removable media can be inserted into the portable wireless communication device.

Figure 1:
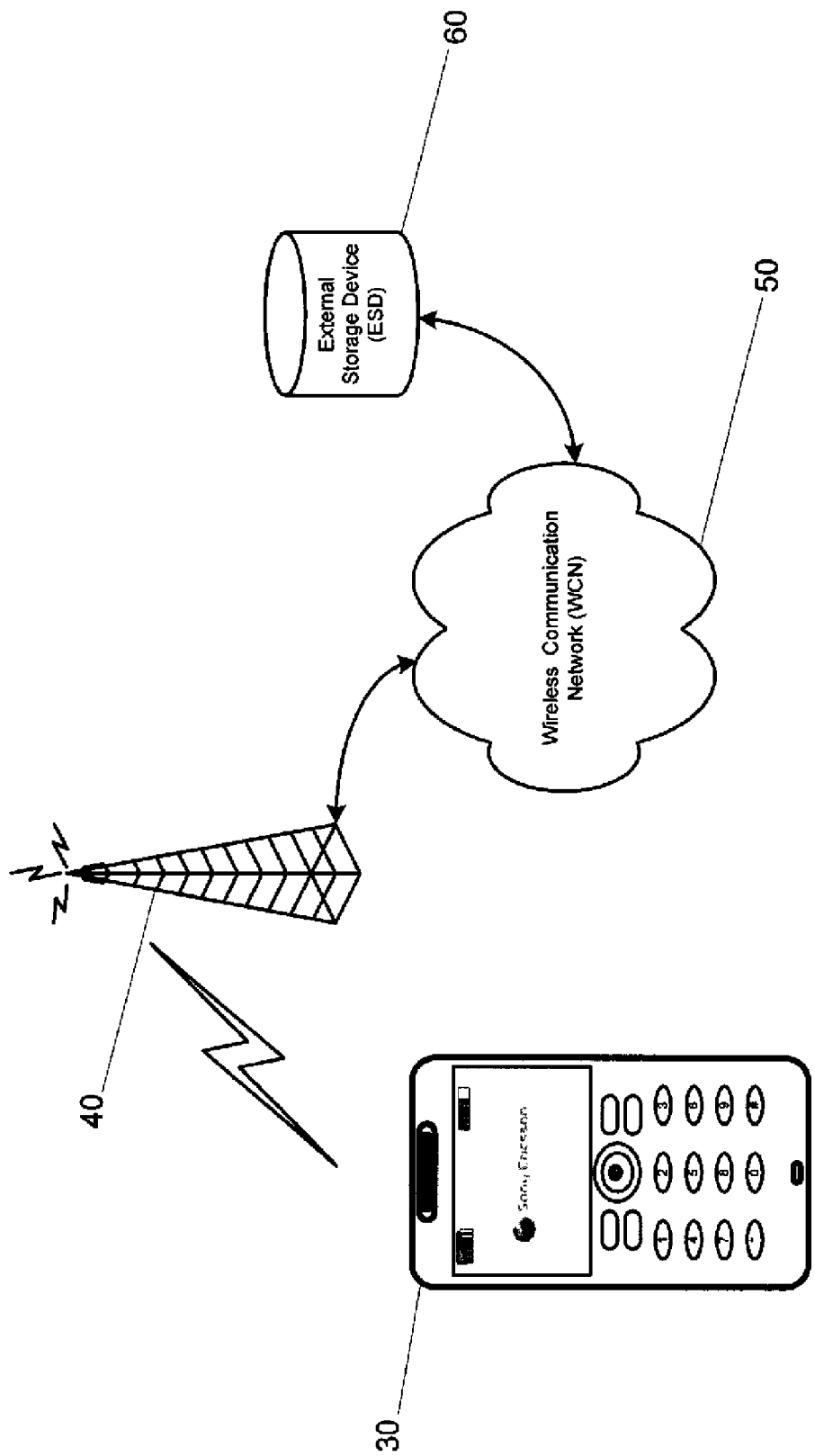
FIG. 1 is a block diagram illustrating the environment in which the present invention operates.

Referring now to the drawings, wherein like numerals designate corresponding or similar elements throughout the several figures. FIG. 1 illustrates a typical communication environment at 20, within which the inventive method can be practiced. The environment 20 includes a portable wireless communication device 30, a communications system 40, a wireless communication network 50, and an external storage device 60.

A user has at least one file stored on a portable wireless communication device's 30 internal memory. The method allows the user to transfer one or more files from the portable wireless communication device 30 to an external storage device 60. Moreover, a portable wireless communication device 30 can receive one or more files from an external storage device 60. To transfer or receive files from an external storage device 60, a wireless connection between the portable wireless communication device 30 and an external storage device 60 is established. To establish the connection the portable wireless communication device 30 sends a RF signal that is received by the communication system 40. The communication system 40 transfers the signal to a wireless communication network 50. The wireless communication network 50 is a coupled with a plurality of communication systems (base-stations) and is also coupled with computer peripheral devices such as servers, storage devices, etc. In the present illustration, the wireless communication network 50 is linked to the external storage device 60 such that the portable wireless communication device 30 is communicable with the external storage device 60.

The user must submit a password or other security certificate while attempting to establish a connection 100 with the external storage device 60. If the external storage device 60 authenticates the user, the connection 100 is established. Establishing the connection 100 between the portable wireless communication device 30 and the external storage device 60 can occur automatically or manually, at the user's option.

Figure 2:
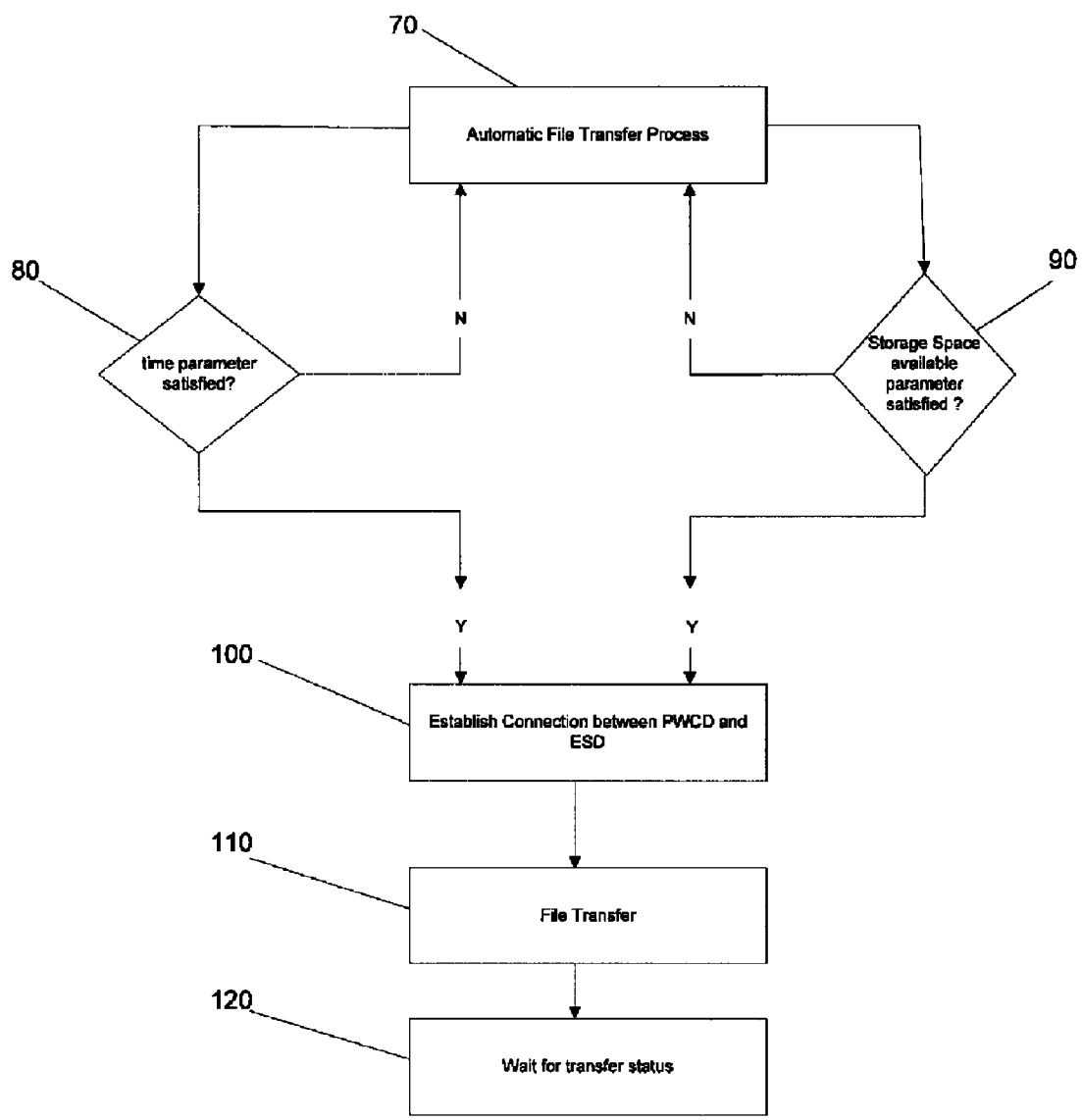
FIG. 2 is a flowchart illustrating the present inventive steps for an automatic transfer of files from a portable wireless communication device to an external storage device via a wireless communication network.

FIG. 2 illustrates an automatic file transfer 70 of files from the portable wireless communication device 30 to the external storage device 60 via a wireless communication network 50, according to one embodiment of the present method. The automatic file transfer 70 commences when a preset condition is triggered. The user has at least two definable conditions that can activate an automatic file transfer 70. A first condition is a user settable time parameter 80. Here, the user presets a time in the portable wireless communication device 30 for initiating an automatic file transfer 70. This time parameter 80 allows the user to schedule the time, day, and frequency of an automatic file transfer. For example, a user may desire to transfer multiple files every Sunday at 11:59 pm.

A second condition for activating an automatic transfer of files is a storage space available parameter 90. Here, the user presets the amount of available internal memory that the portable wireless communication device 30 must maintain. Under this condition an automatic file transfer 70 commences when the available memory falls below the user preset. For example, a user may desire for the available internal memory to be at least 30% of the total capacity. If the available memory falls below the 30% preset, the portable wireless communication device 30 will activate an automatic file transfer 70. The portable wireless communication device 30 will transfer the amount of files required to regain the current preset.

When either the first or second condition above is satisfied the method automatically seeks to establish a connection 100 between the portable wireless communication device 30 and the external storage device 60. After a connection 100 is established the file transfer process 110 commences. Single or multiple data files may be transferred in the file transfer process 110. The data files are wirelessly transferred via the wireless communication network 50 from the portable wireless communication device 30 to the external storage device 60.

The external storage device 60 can be programmed to send a transfer status 120 to the portable wireless communication device 30 via the wireless communication network 50. This feature informs the user whether or not the file transfer process 110 was successful. The portable wireless communication device's 30 RF module receives the transfer status 120 that was sent via the established connection 100 and presents it on the display.

Aside from the automatic file transfer 70 previous disclosed, the user may manually transfer multiple files from the portable wireless communication device 30 to the external storage device 60 via the wireless communication network 50. Here, the user seeks to establish the connection 100 manually between the portable wireless communication device 30 and the external storage device 60. The connection 100 process is established as previously described. After the connection 100 is established, the user selects which data files to transfer. The user then commences the file transfer process 110. Again, the external storage device 60 can send a transfer status 120 to the portable wireless communication device 30 as previously described.

Figure 3:
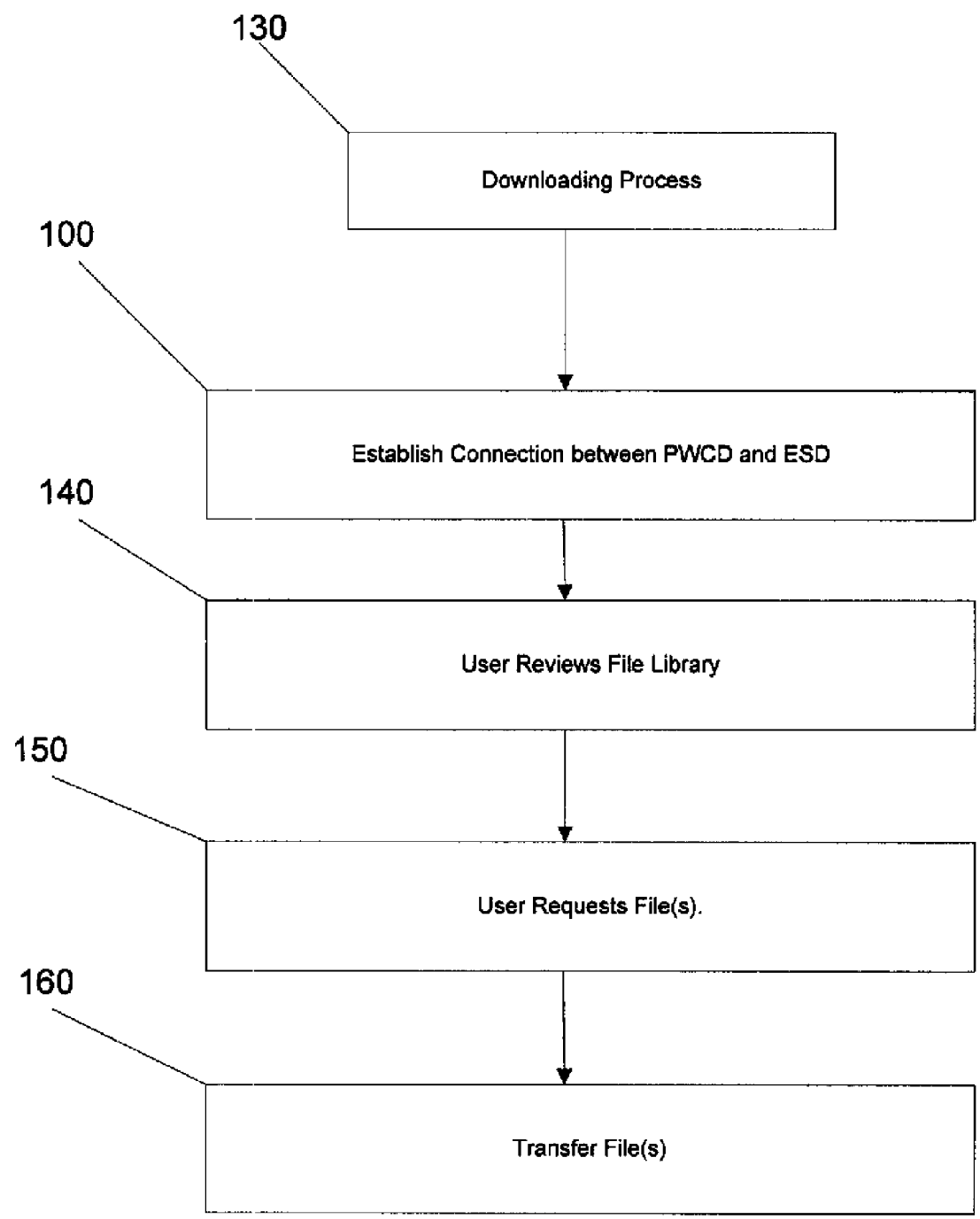
FIG. 3 illustrates the present inventive steps for transferring files from an external storage device to a portable wireless communication device via a wireless communication network.

FIG. 3 illustrates a wireless downloading process 130 of data files from an external storage device 60 to a portable wireless communication device 30 via a wireless communication network 50, according to another embodiment of the present inventive method. The user first establishes a connection 100 between the portable wireless communication device 30 and the external storage device 60. The connection 100 process is established as previously described.

After the connection 100 is established, the user reviews 140 a list of previously transferred data files. This list may reside on the portable wireless communication device. Moreover, the user can erase the list from the portable wireless communication device at any time. In an alternate embodiment of the present invention, the list of previously transferred files resides on the external storage device 60. Here, the list maybe sent via the connection 100 to the user upon request.

Next, the user requests 150 specific data files from the library. The user may also request that specific files are deleted from the external storage device 60. After the user request 150 is received by the external storage device 60, the files are wirelessly transferred to the portable wireless communication device 30 from the external storage device 60 via the connection 100.

The present invention provides a system and/or method that allows a user to wirelessly transfer single or multiple data files from a portable wireless communication device to an external storage device. The present invention also allows the user to wirelessly receive single or multiple files on a portable wireless communication device from an external storage device. This invention eliminates the need for a portable wireless communication device to be physically connected or in close proximity to an external storage means in order to transfer or receive data files. It also eliminates the repetitive process that requires a user to transfer or receive one data file at a time. Some uses of the present invention are detailed below to provide a contextual understanding of the benefits of the present invention. This disclosure is not intended to limit the application of the present invention to the examples below as there can be and are many more example usages of the present invention.

A natural disaster damages a large number of dwellings. An insurance adjuster must have pictures of the damage to dwellings that are insured. The insurance adjuster has a portable wireless communication device that includes a digital camera. He uses it to capture images of the damaged property. The internal memory of the device becomes filled. The insurance adjuster uses the present invention to transfer multiple images on command to an external storage device. Once the transfer is verified as successful, the portable wireless communication device has available memory for more images.

A family is on vacation. The family uses a portable wireless communication device that includes a digital camera to record images of the vacation. Eventually, the device's internal memory is filled. The family can use this invention to wirelessly transfer multiple images to an external storage device, thereby freeing up memory for more images.

A real estate agency takes a number of new listings for houses each day. An employee of the agency takes pictures of each new listing. The employee uses a portable wireless communication device that includes a digital camera to capture images of each house. The employee does not want to upload images during the day while adding new images. He uses the present invention to set a time parameter to trigger an automatic file transfer to occur at a later time.

A backpacker is out for a hike. The backpacker takes along a portable wireless communication device that includes a digital camera. During the next few days the backpacker takes pictures and fills the device's internal memory. The present invention can automatically transfer the images to after the available internal memory falls below a preset value.

The user's portable wireless communication device includes an MP3 audio file player. The user has stored multiple MP3 audio files on his portable wireless communication device but they take up significant space in memory. The user has many more MP3 audio files stored on an external storage device and wishes to download some of them to his portable wireless communication device. To do so, he needs to make room on local memory by uploading data files to the external storage device before downloading the new MP3 audio files. Typically, he will return one or more locally stored MP3 audio files in favor of one or more new MP3 audio files.

A family is on vacation. The family uses a portable wireless communication device that includes a digital video camera to record video snippets of the vacation. Eventually, the device's internal memory nears capacity. The family can use this invention to wirelessly transfer multiple video files to an external storage device, thereby freeing up memory for more video files.

The user's portable wireless communication device includes an application that can open and display text files.

The user has stored multiple text files on his portable wireless communication device but they take up significant space in memory. The user has many more text files stored on an external storage device and wishes to download some of them to his portable wireless communication device. To do so, he needs to make room on local memory by uploading (or deleting) data files to the external storage device before downloading the new text files.

Although the present invention has been shown and described in considerable detail with respect to an exemplary embodiment of the invention, it should be understood by those skilled in the art that it is not intended to limit the invention to specific embodiments disclosed. Various modifications, omissions, and additions may be made to the disclosed embodiments without materially departing from the novel teachings and advantages of the invention, particularly in light of the foregoing teachings.

What is claimed is:

1. A method of transferring data files previously transferred from an internal memory within a cellular telecommunications device to an external storage device from the external storage device back to the internal memory within the cellular telecommunications device by means of a wireless cellular communication network, the method comprising:
    presenting an option to a user of the cellular telecommunications device for presetting at least one user-settable trigger condition for automatic file transfer, the option presented comprising:
        an option for setting a storage space available parameter that indicates an amount of free storage space available in the internal memory that the cellular telecommunications device is to maintain;
    receiving a selection from the user of the option;
    establishing a connection between the cellular telecommunications device and the external storage device by means of the wireless cellular communication network, the connection being established when the user-settable preset trigger condition occurs, file transfer starting when an amount of free storage space available in the internal memory falls below a user preset amount, wherein the user preset amount relates to a storage space amount that is other than full and empty, and wherein the cellular telecommunications device transfers an amount of data files so that the free storage space available returns back to the user preset amount;
    in response to the storage space available parameter being selected, transferring data files from the internal memory to the external storage device over the wireless cellular communication network, until an amount of the data files required to regain the user preset amount is transferred so that the cellular telecommunications device regains the user preset amount of free storage space available in the internal memory.

2. The method of claim 1, wherein the data files include image files, video files, audio files, text files, or any combination thereof.

3. The method of claim 1, wherein the user preset amount comprises an amount selected between 10% and 40%.

4. The method of claim 1, further comprising:
    in response to said automatically transferring the data files, automatically presenting a list of the data files that were previously transferred from the internal memory within the portable wireless communication device to the external storage device; and
    requesting specific data files from the list in response to the list being presented; and transferring the requested data files from the external storage device to the internal memory within the portable wireless communication device.

5. The method of claim 1, wherein the automatic transfer of the data files ceases immediately once the amount of free storage space available in the internal memory exceeds the storage space available value that is preset by a user of the cellular telecommunications device.

6. The method of claim 1, further comprising: in response to the user-settable time parameter being preset to transfer files at a predetermined time and in response to the predetermined time occurring, automatically transferring data files from the internal memory to the external storage device over the wireless cellular communication network until an amount of the data files required to regain the user preset amount is automatically transferred so that the cellular telecommunications device regains the user preset amount of free storage space available in the internal memory.

7. A system for transferring data files previously transferred from an internal memory within a cellular telecommunications device to an external storage device from the external storage device back to the internal memory within the cellular telecommunications device by means of a wireless communication network, the system comprising:
    means for presenting an option to a user of the cellular telecommunications device for presetting at least one user-settable trigger condition for automatic file transfer, the option comprising:
        an option for setting a storage space available parameter that indicates an amount of free storage space available in the internal memory that the cellular telecommunications device is to maintain;
    means for receiving a selection from the user of the option;
    means for establishing a connection between the cellular telecommunications device and the external storage device by means of the wireless communication network, the connection being established when a user-settable preset trigger condition within the cellular telecommunications device occurs, the preset trigger comprising a storage space available value, file transfer starting when an amount of free storage space available in the internal memory falls below the storage space available value, wherein the user preset amount relates to a storage space amount that is other than full and empty, and wherein the cellular telecommunications transfers device an amount of data files so that the free storage space available returns back to the user preset amount; and
    means for automatically transferring data files from the internal memory to the external storage device responsive to the preset trigger, an amount of the data files required to regain the storage space available value being automatically transferred when the amount of free storage space available in the internal memory falls below the storage space available value so that the cellular telecommunications device regains the user preset amount of free storage space available in the internal memory.

8. The system of claim 7, wherein the data files include image files, video files, audio files, text files, or any combination thereof.

9. The system of claim 7, further comprising:
    means for automatically presenting a list of the data files that were previously transferred from the internal memory within the portable wireless communication device to the external storage device in response to said automatically transferring the data files;

means for requesting specific data files from the list in response to the list being presented; and means for transferring the requested data files from the external storage device to the internal memory within the portable wireless communication device.

10. A portable wireless communication device that can retrieve data files previously transferred from an internal memory within the portable wireless communication device to an external storage device via a wireless communication network, the portable wireless communication device comprising:

a graphical user interface that presents an option to a user of the cellular telecommunications device for presetting at least one user-settable trigger condition for automatic file transfer, the option presented comprising:

an option for setting a storage space available parameter that indicates an amount of free storage space available in the internal memory that the cellular telecommunications device is to maintain;

receiving a selection from the user of the option;

an RF module configured to establish a connection between the portable wireless communication device and the external storage device via the wireless communication network, the connection being established when a user settable preset trigger condition within the portable wireless communication device occurs, the preset trigger condition comprising a storage space available value, file transfer starting when an amount of storage space available in the internal memory falls below the storage space available value, wherein the storage space available amount relates to a user-preset amount that is other than full and empty, and wherein the cellular telecommunications device transfers an amount of data files so that the storage space available returns back to the user-preset amount; and a file transfer component configured for automatically transferring data files from the internal memory to the external storage device responsive to the preset trigger using the RF module connection when the amount of storage available in the internal memory falls below the storage space available value so that the cellular telecommunications device regains the user preset amount of free storage space available in the internal memory.

11. The portable wireless communication device of claim 10, wherein the data files include image files, video files, audio files, text files, or any combination thereof.

12. The portable wireless communications device of claim 10, further comprising:

a file review component stored on the portable wireless communication device for automatically presenting a list of the data files that were previously transferred from the internal memory within the portable wireless communication device to the external storage device, and requesting specific data files from the list in response to said automatically transferring the data files, and wherein the file transfer component is configured to receive the data files from the external storage device to the portable wireless communication device.

* * * * *